United States Patent [19]

Mihalich

[11] Patent Number: 5,515,656
[45] Date of Patent: May 14, 1996

[54] PORTABLE ANCHORAGE AND FASTENER

[76] Inventor: George M. Mihalich, 3944 Cameron Ave., Hammond, Ind. 46327

[21] Appl. No.: 149,621

[22] Filed: Nov. 9, 1993

[51] Int. Cl.$^6$ ........................................... E02D 5/80
[52] U.S. Cl. .................. 52/155; 52/158; 52/147; 248/156
[58] Field of Search ................... 52/155, 156, 157, 52/160, 161, 166, 146, 147, 148, 295; 248/188.1, 354.1, 547, 156

[56] References Cited

U.S. PATENT DOCUMENTS

| | | |
|---|---|---|
| 729,591 | 6/1903 | Jacob . |
| 1,349,476 | 8/1920 | Solberg . |
| 1,529,679 | 3/1925 | Woolley ............................ 52/158 X |
| 1,550,276 | 8/1925 | Nilson . |
| 1,676,197 | 7/1928 | Marrinan . |
| 1,721,436 | 7/1929 | Dubois et al. ..................... 52/158 X |
| 2,156,021 | 4/1939 | Little . |
| 2,870,884 | 1/1959 | Mazur .................................. 52/158 |
| 3,500,598 | 3/1970 | Ettinger ............................... 52/155 |
| 3,605,359 | 9/1971 | Bader et al. ........................ 52/146 |
| 3,808,756 | 5/1974 | Cooper et al. . |
| 3,888,057 | 6/1975 | Zubke ................................. 52/166 |
| 4,079,556 | 3/1978 | Luck et al. .......................... 52/698 |
| 4,363,198 | 12/1982 | Meyer . |
| 4,452,018 | 6/1984 | Hill ..................................... 52/155 |
| 4,679,369 | 7/1987 | Kinsley et al. . |
| 4,831,798 | 5/1989 | Otteson . |

FOREIGN PATENT DOCUMENTS

| | | | |
|---|---|---|---|
| 0339704 | 8/1921 | Germany ............................ 52/155 |
| 0823336 | of 1952 | Germany ............................ 52/155 |
| 0610912 | 6/1978 | U.S.S.R. . |
| 2008648 | 6/1979 | United Kingdom ................ 52/155 |

Primary Examiner—Carl D. Friedman
Assistant Examiner—Winnie S. Yip
Attorney, Agent, or Firm—Patula & Associates

[57] ABSTRACT

A portable anchorage and fastener device for securing movable articles or structures to a land mass comprising a lightweight yet rigid plate having an entry face, a ground face, a fastener end and a plurality of picket holes, each of said holes being surrounded by a guide ring affixed to the entry face of the plate at an angle for directing tubular hollow pickets inserted therewithin angularly into the ground. The invention is further comprised of a safety breakage cord removably attached to the fastener end of the plate for securing the guyline in the event of breakage of the guyline at a looped end thereof, and a fastener hook also removably attached to the fastener end of the plate for guyline attachment thereto.

16 Claims, 1 Drawing Sheet

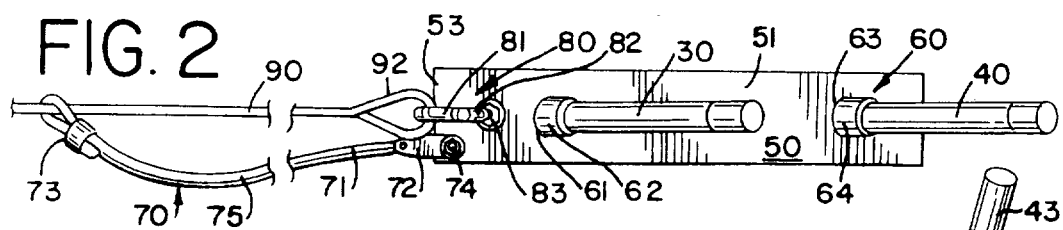
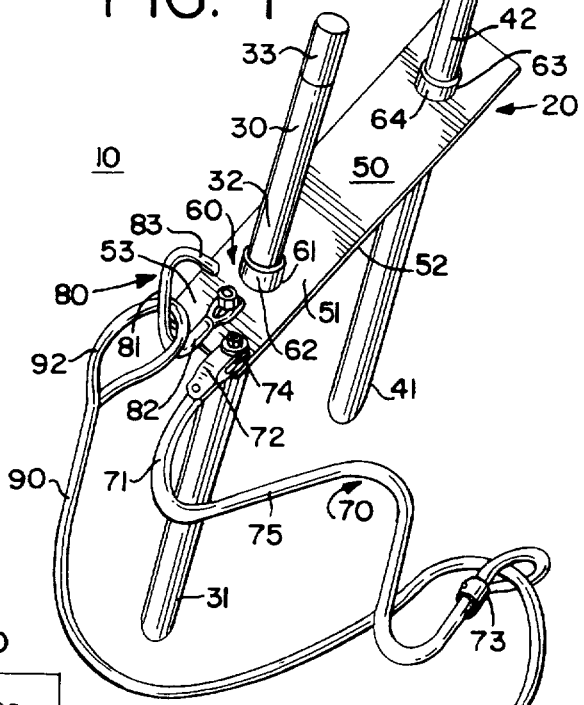
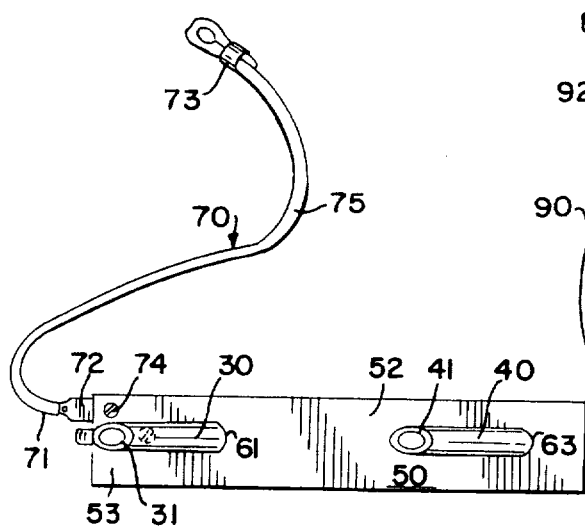
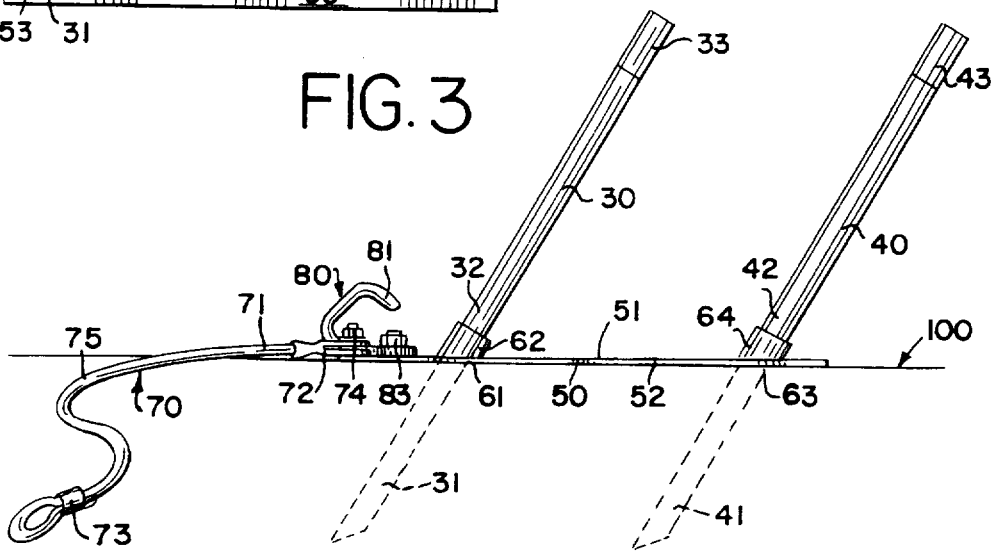

PORTABLE ANCHORAGE AND FASTENER

This invention relates to devices for anchoring movable objects to stationary sites and, more particularly, to portable devices for anchoring objects to a land mass, with the devices having fastener means incorporated therewithin.

BACKGROUND OF THE INVENTION

Ground anchors are tools frequently used to station movable objects. These anchors can be natural, temporary or permanent devices. In each case, the object is to utilize the anchor to fix the position of an otherwise movable article or structure.

The configurations of ground anchors vary greatly depending on the purpose and intended duration of the anchoring needed. For example, in U.S. Pat. No. 4,679,369 issued to Kinsley, et al., a ground anchor for securing aircraft arresting gear is disclosed. This invention is designed to allow multiple pickets or stakes to be driven into the ground one at a time and up to an unlimited number. The parts of the device are separable, with each stake being secured to the next stake by a stake tie which is a rigid bar. This invention may provide a high degree of stability, but it is unfortunately very time consuming to assemble given that each stake is individually placed, driven and secured into the ground by a series of steps and adjustment of independent parts.

Similarly, U.S. Pat. No. 4,363,198 issued to Meyer discloses an anchoring system with separate stakes independently driven into the ground. This invention is designed for securing motor vehicles. It employs a slide hammer for driving the stake portion of the invention into the ground, having a shaft slid over the slide hammer for holding a cable which interconnects and provides anchoring tension between a second slide hammer. This invention likewise requires separate parts independently positioned and tensioned.

The same is true for U.S. Pat. No. 729,591 issued to Jacob, an anchoring system for bridges, which teaches a combination of suspension cables, horizontally disposed timbers, brace rods connecting the timbers with the cables and piles driven in front of the timbers. This invention likewise requires multiple steps and separate treatment for the separate parts which must be placed, driven and tensioned separately to achieve the desired anchoring effect.

Other prior art focuses on relatively unitary designs. In U.S. Pat. No. 1,349,476 issued to Solberg, for example, a ground anchor is disclosed having sharp claw-like prongs at its two ends for clutching the ground for anchoring effect. U.S. Pat. No. 1,676,197 issued to Marrinan utilizes a staple-like configuration having a movable prong attached to the staple-like portion, which prong is actuated to assist in anchoring when anchoring tension is applied. Another configuration is disclosed in U.S. Pat. No. 2,156,021 issued to Little in which a tent peg is claimed comprised of a helical lower anchoring portion with an eye formed at its midsection and a loop formed at its upper section. A hook having a ground prong engages the eye of the peg and provides additional anchoring effect. U.S. Pat. No. 3,808,756 to Cooper, et al. teaches a ground anchor for securing mobile homes having a planar portion and a U-shaped member interlocking with the planar portion.

U.S. Pat. Nos. 4,831,798 issued to Otteson and 1,550,276 issued to Nilson disclose still different configurations of ground anchors. However, the above references lack a combination of unitary yet multiple stake ground anchor which is easy to position and yet stable enough to provide a high degree of anchoring effect for weighty objects.

It is, therefore, an object of the present invention to improve upon the prior art of ground anchors by providing an anchorage and fastener device comprised of a single pre-assembled unit having multiple pickets.

Another object of the present invention is to provide a portable ground anchor which is lightweight yet durable and easy to install by utilizing a single unit configuration.

Another object of the present invention is to provide a ground anchor having tubular hollow pickets which allow for ready picket placement by allowing ground otherwise displaced to be forced up into the pickets.

Still another object of the present invention is to provide a unitary or one piece ground anchor with a guyline security feature.

Another object of the present invention is to provide a unitary piece ground anchor having fastener and security features removably attached to the device to maximize its flexibility, portability and ease of use.

Yet another object of the present invention is to provide a unitary piece ground anchor having its picket angle predetermined and integrally fixed to speed placement and enhance anchoring effect of the device.

Numerous other advantages and features of the invention will become readily apparent from the detailed description of the preferred and alternative embodiments of the invention, from the claims, and from the accompanying drawings, in which like numerals are employed to designate like parts throughout the same.

SUMMARY OF THE INVENTION

The present invention is a portable anchorage and fastener device for securing movable articles or structures to a land mass comprising a lightweight yet rigid plate having an entry face, a ground face, a fastener end and a plurality of picket holes, each of said holes being surrounded by a guide ring affixed to the entry face of the plate at an angle for directing tubular hollow pickets inserted therewithin angularly into the ground. The invention is further comprised of a safety breakage cord removably attached to the fastener end of the plate and a fastener hook also removably attached to the fastener end of the plate for guyline attachment thereto. The guyline is threaded through a looped end of the safety cord. A looped end of the guyline is then attached to the fastener hook. In the event of breakage of the guyline at its looped end, the safety cord restricts the travel of the broken guyline and whips it to the ground.

BRIEF DESCRIPTION OF THE DRAWINGS

A fuller understanding of the foregoing may be derived by reference to the accompanying drawings, wherein:

FIG. 1 is a top perspective view of the present invention taken from the fastener end of the invention;

FIG. 2 is a top plan view of the present invention;

FIG. 3 is a side elevational view of the present invention in use in the ground; and FIG. 4 is a bottom plan view of the present invention.

DETAILED DESCRIPTION OF THE DRAWINGS

While the invention is susceptible of embodiment in many different forms, there is shown in the drawings and will be described herein in detail, a preferred embodiment of the invention. It must be understood, however, that the present disclosure is to be considered an exemplification of the principles of the invention and is not intended to limit the spirit and scope of the invention and/or claims of the embodiment illustrated.

Referring now to FIG. 1, there is shown the device 10 of the present invention having anchorage means 20 comprised of a base plate 50 having an entry face 51, a ground face 52 and a fastener end 53. Said anchorage means 20 is further comprised of guide means 60, wherein said base plate 50 is defined by at least one hole 61 but, preferably, a plurality of holes. In the preferred embodiment of the invention these holes number two, shown as guide holes 61 and 63. Guide means 60 is further defined by guide rings 62 and 64 angularly affixed to said entry face 51 of said base plate 50 bordering guide holes 61 and 63, respectively, such that the axis of said guide rings 62 and 64 assumes a predetermined angle relative to said base plate 50. Said anchorage means 20 is further defined by a first picket 30 having an anchor end 31, a midsection 32 and a top end 33, and a second picket 40 having an anchor end 41, a midsection 42 and a top end 43, wherein said anchor ends 31 and 41 of pickets 30 and 40, respectively, are inserted through said guide rings 62 and 64, respectively, from said entry face 51 of said base plate 50, and slid therethrough up to said midsections 32 and 42. In the preferred embodiment of the invention, said pickets 30 and 40 are hollow tubular members. It should be understood however that the invention can be used with only one picket 30 or 40.

Said device 10 is further comprised of safety means 70 removably affixed to said fastener end 53 of said base plate 50. Said safety means 70 is comprised of a safety cord 75 having a tie end 73, a plate end 71 with a grip member 72 attached thereto and adapted to removably grip said base plate 50 at said fastener end 53, and a bolt 74 for affixing said grip member 72 to said base plate 50 upon tightening said grip member 72. In the preferred embodiment of the invention, tie end 73 is a looped configuration, although other conventional means of facilitating tying may be employed.

Said device 10 is further comprised of fastener means 80 defined by hook 81 having bolt end 82, and bolt 83 which removably and securely affixes said bolt end 82 of said hook 81 to said fastener end 53 of said base 50.

In the preferred embodiment of the invention, said first picket 30 and said second picket 40 are inserted through said guide hole 61 and guide ring 62, and said guide hole 63 and guide ring 64, respectively, from said entry face 51 of said base plate 50 to assume the predetermined angle set by said guide rings 62 and 64. Said ground face 52 of base plate 50 then is placed against the ground site chosen for positioning the device 10 by driving said pickets 30 and 40 into the ground at the aforementioned predetermined angle until the ground abuts said ground face 52 of said base plate 50, thereby allowing dirt or other ground component to be forced up into the hollow body of said pickets 30 and 40. Pickets 30 and 40 can be selectively set at varying depths in base plate 50 such that the distance the pickets are driven into the ground varies accordingly. This allows the invention to be adaptable to almost any type of ground. For example, should one of the pickets being driven into the ground hit a solid surface part of the way down, that picket could be adjusted to only that depth while the other picket is driven to a deeper depth. Fastener means 80 then can be implemented by affixing a guyline 90 or guylines to hook 81 to provide the anchorage and fastener means of the present invention. The guyline 90 is threaded through looped end 73 of safety cord 75. A looped end 92 of the guyline 90 is then attached to hook 81. In the event of a breakage of guyline 90 at its looped end 92, the safety cord 75 restricts the travel of the broken guyline and whips it to the ground. Thus, the potential for injury due to the suddenly emancipated guyline is greatly lessened or annulled. Both the safety means 70 and fastener means 80 may be removed from the device 10 by removing the bolts 74 and 83, respectively.

FIG. 2 is a top view of the present invention showing base plate 50 with entry face 51 and fastener end 53. Guide means 60 is comprised of holes 61 and 63 and guide rings 62 and 64. First picket 30 and second picket 40 are inserted through guide rings 62 and 64, respectively, at the predetermined angle. The safety cord 75 of safety means 70 is removably secured at plate end 71 to fastener end 53 of base plate 50 via grip member 72 and bolt 74. Safety cord 75 further includes tie end or looped end 73. Fastener means 80 is shown attached to fastener end 53 of base plate 50. Fastener means 80 includes hook 81, bolt end 82 and bolt 83.

FIG. 3 is a side view of the present invention in use in ground 100. Base plate 50 having entry face 51 and ground face 52 is shown wherein ground face 52 is abutting the surface of ground 100. Picket 30 and picket 40 are inserted through hole 61 and guide ring 62 and hole 63 and guide ring 64, at the determined angle, respectively. Anchor ends 31 and 41 of pickets 30 and 40 respectively are embedded in ground 100 and are illustrated by dotted lines. Top ends 33 and 34 of pickets 30 and 40, respectively remain above ground 100 and base plate 50. Safety means 70 is shown with plate end 71 of safety cord 75 attached to base plate 50 via grip member 72 and bolt 74. Safety cord 75 further includes tie end 73. Fastener means 80 is shown having hook 81 fastened to base plate 50 via bolt 83.

FIG. 4 is a bottom view of the invention illustrating ground face 52 of base plate 50. Hollow pickets 30 and 40 protrude through holes 61 and 63 respectively at the predetermined angle. Pickets 30 and 40 have ends 31 and 41 respectively. Safety means 70 is shown wherein safety cord 75 is attached at plate end 71 to base plate 50 via grip member 72 and bolt 74. Safety cord 75 has tie end 73 at its free end.

The use of the invention 10 will now be described with reference to anchoring of a ship or boat. It should be understood however that the present invention could be used to anchor any object desired to be anchored.

When ships or boats are to be anchored offshore, it is desirable to anchor the ship or boat such that the bow of the ship or boat is facing into the waves. The ship or boat is anchored this way so that the waves do not strike the side of the vessel and cause damage or cause water to come over the sides and onto the vessel. The ship's bow anchor is insufficient to hold the ship in this position since the ship is free to pivot about the anchor line due to wind forces or wave forces. Accordingly, the ship must be anchored by a second anchor to the shoreline.

Pickets 30 and 40 of the present invention are driven into an appropriate location on the shoreline with plate 50 linearly aligned with the bow and stern of the vessel, in a direction facing into the waves. The stern of the vessel is then anchored to the present invention via guyline 90 placed through looped end 73 of safety cord 75 and attached to hook 81. The vessel, now anchored by its bow anchor and the present invention, remains in the water facing into the waves such that the waves pass by.

As the forces on the vessel attempt to swing the stern of the vessel, invention 10 prevents this from happening. The pulling force on the guyline results in a pulling force on plate 50 at an angle to its longitudinal axis. This pulling force can result in a conventional ground anchor skewing or rotating in the ground, and thus allowing the vessel to rotate. However, in the present invention, plate 50 prevents skewing of the anchor since the plate 50 is connected to a first picket at one end and a second picket at another.

It is to be understood that the embodiments herein described are merely illustrative of the principles of the present invention. Various modifications may be made by those skilled in the art without departing from the spirit and/or scope of the claims which follow.

What is claimed is:

1. A ground anchor for securing a movable object to a ground site via a guyline, said anchor comprised of:

anchorage means comprised of a base plate having an entry face and a ground face, a plurality of guide holes formed therethrough, guide rings angularly affixed to and having an axis set at a predetermined angle to said entry face of said base plate and bordering said guide holes, a fastener end, and a plurality of pickets inserted one through each of said guide holes and each having an anchor end, a midsection and a top end whereby said anchor end is driven into the ground at a desired ground anchor site until said ground face abuts the ground, with said pickets assuming the angle predetermined by the set angle of the axis of said guide rings;

fastener means removably affixed to said anchorage means for fastening said movable object to said anchorage means by a guyline connected thereto and attached to said movable object; and safety means removably affixed to said anchorage means for receiving and resisting travel of said guyline.

2. The ground anchor recited in claim 1, wherein said safety means is comprised of a safety cord having a tie end and a plate end with a grip member secured thereto, said safety means further comprised of a bolt which removably affixes said grip member to said fastener end of said base plate upon tightening said bolt, and with said tie end being adapted to receive said guyline therethrough.

3. The ground anchor recited in claim 1, wherein said safety means is comprised of a safety cord having a tie end and a plate end with a grip member secured thereto, said safety means further comprised of a bolt which removably affixes said grip member to said fastener end of said base plate upon tightening said bolt, and with said tie end being adapted to receive said guyline therethrough; and said fastener means is comprised of a hook having a bolt and a bolt end removably secured to said fastener end of said plate by tightening said bolt, with said hook adapted to receive a guyline line for anchoring said movable object to said ground anchor means by connecting said guyline attached to said movable object to said hook.

4. The ground anchor recited in claim 3, wherein said plurality of pickets include two picket members.

5. The ground anchor recited in claim 3, wherein said plurality of pickets are two hollow tubular members which cause dirt to be forced up therewithin upon driving said pickets into said ground site for implementing anchoring.

6. A portable anchorage and fastener device comprising:

a base plate having a first end, a second end, a top surface and a bottom surface;

a first guide hole in said base plate near said first end and a second guide hole in said base plate near said second end, said second guide hole in linear alignment with said first guide hole;

a first guide ring set at a predetermined angle to said base plate on said top surface of said guide plate over said first hole;

a second guide ring set at a predetermined angle to said base plate on said top surface of said guide plate over said second hole, said second guide ring in linear alignment with said first guide ring;

a first picket inserted through said first guide ring and said first guide hole at said predetermined angle to said base plate;

a second picket inserted through said second guide ring and said second guide hole at said predetermined angle to said base plate, said second picket in linear alignment with said first picket;

fastening means attached to said first end of said base plate for receiving a guyline; and safety means removably attached to said base plate near said fastening means for receiving and resisting travel of said guyline.

7. The device of claim 6, wherein said fastening means is comprised of a hook removably attached to said base plate.

8. The device of claim 6, wherein said safety means is comprised of a safety cord having a tie end and a loop end, said tie end removably attached to said base plate and said loop end receiving said guyline therethrough.

9. The device of claim 6, wherein said first and second pickets are inserted through said first and second guide rings and guide holes to a selected and adjustable depth.

10. The device of claim 6, wherein said first and second pickets are hollow tubular members which cause ground substance to be received in said hollow tubular members upon driving said pickets into a ground site for implementing anchoring.

11. The device of claim 10, wherein said first picket, said second picket, and said fastening means are linearly aligned on said base plate.

12. An anchor comprising:

a rectangular base plate having a fastener end, a back end, a top surface, a bottom surface, and a longitudinal central axis;

a plurality of bores in said rectangular base plate deposed along said longitudinal axis;

a plurality of guides on said top surface surrounding said plurality of bores and being set at a predetermined angle to said rectangular base plate;

a plurality of pickets adjustably positioned in said rectangular base plate through said plurality of bores and guides and assuming said predetermined angle to said rectangular base plate;

fastening means mounted to said rectangular base plate at said fastener end for receiving a guyline attached to an object to be anchored; and safety means removably attached to said rectangular base plate near said fastening means for receiving and resisting travel of said guyline.

13. The anchor of claim 12, wherein said fastening means is comprised of a hook removably attached to said rectangular base plate along said longitudinal central axis.

14. The anchor of claim 12, wherein said safety means is comprised of a safety breakage cord having a tie end and a loop end, said tie end removably attached to said rectangular base plate and said loop end receiving said guyline therethrough.

15. The anchor of claim 12, wherein said plurality of pickets are inserted through said plurality of guides and bores to a selected and adjustable depth.

16. The anchor of claim 12, wherein said plurality of pickets are hollow tubular members which cause ground substance to be received in said hollow tubular members upon driving said pickets into a ground site for implementing anchoring.

* * * * *